United States Patent [19]

Tingley

[11] Patent Number: 4,826,200
[45] Date of Patent: May 2, 1989

[54] BOAT LOCKING DEVICE

[76] Inventor: William C. Tingley, 3511 E. Jasper, Tulsa, Okla. 74155

[21] Appl. No.: 183,668

[22] Filed: Apr. 19, 1988

[51] Int. Cl.$^4$ .............................................. B60P 3/10
[52] U.S. Cl. ................................ 280/414.1; 213/175; 280/508; 414/536
[58] Field of Search ..................... 280/414.1, 508, 509, 280/510; 414/536; 144/344; 213/175, 176, 177, 182, 183, 185, 186, 187, 211, 213, 218

[56] References Cited

U.S. PATENT DOCUMENTS

| | | | |
|---|---|---|---|
| 2,096,644 | 10/1937 | Montgomery et al. | 213/175 |
| 2,491,373 | 12/1949 | Goff | 280/508 |
| 2,763,384 | 9/1956 | Foster | 414/536 |
| 3,632,138 | 1/1972 | Whiteley, Jr. | 280/414.1 X |
| 3,938,829 | 2/1976 | Anderson | 280/414.1 |
| 3,963,263 | 6/1976 | Whitlock | 280/414.1 |
| 3,989,266 | 11/1976 | Foster | 280/414.1 |
| 3,989,267 | 11/1976 | Robinson | 280/414.1 |
| 4,114,920 | 9/1978 | Boettcher | 280/414.1 |
| 4,242,768 | 1/1981 | Winsett | 114/344 |
| 4,463,965 | 8/1984 | Lawson | 280/414.1 |

Primary Examiner—Charles A. Marmor
Assistant Examiner—Mitchell J. Hill
Attorney, Agent, or Firm—Head & Johnson

[57] ABSTRACT

A locking mechanism for connecting the bow of a boat to the staff of a boat-trailer. A horizontal bar is connected at one end of a staff and extends toward the rear of the trailer. This bar has a notch near the rear end. A swinging lock arm is pivotally attached to the horizontal bar and in the free position extends above and below the bar. A holding bar frame is attached to the bow of the boat and is substantially U-shaped with the open at the bottom. A round holding bar extends across the open end of the frame. A rolling bar is carried by a stop and release bar assembly which is guided up and down vertically by slots in the side members of the frame. When docking, the horizontal bar and swinging lock arm goes through the space between the round holding bar and the movable rolling bar. As soon as the horizontal bar passes through this space the swinging arms drop down and form a locking T-shape. They can only be released by pulling up on the movable bars so that the horizontal bar can be moved with respect to the holding bar frame.

5 Claims, 5 Drawing Sheets

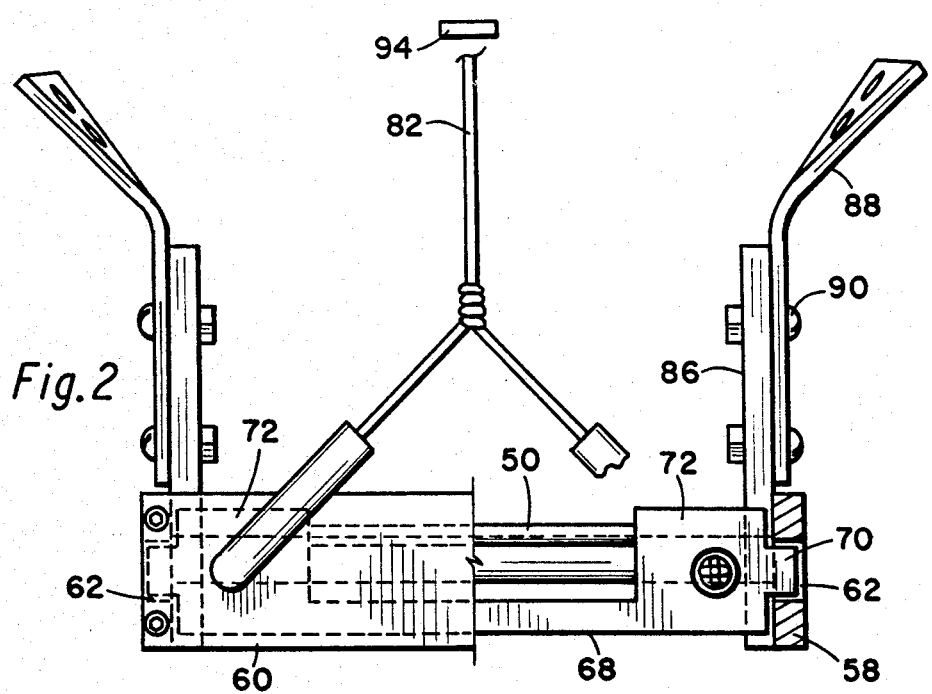
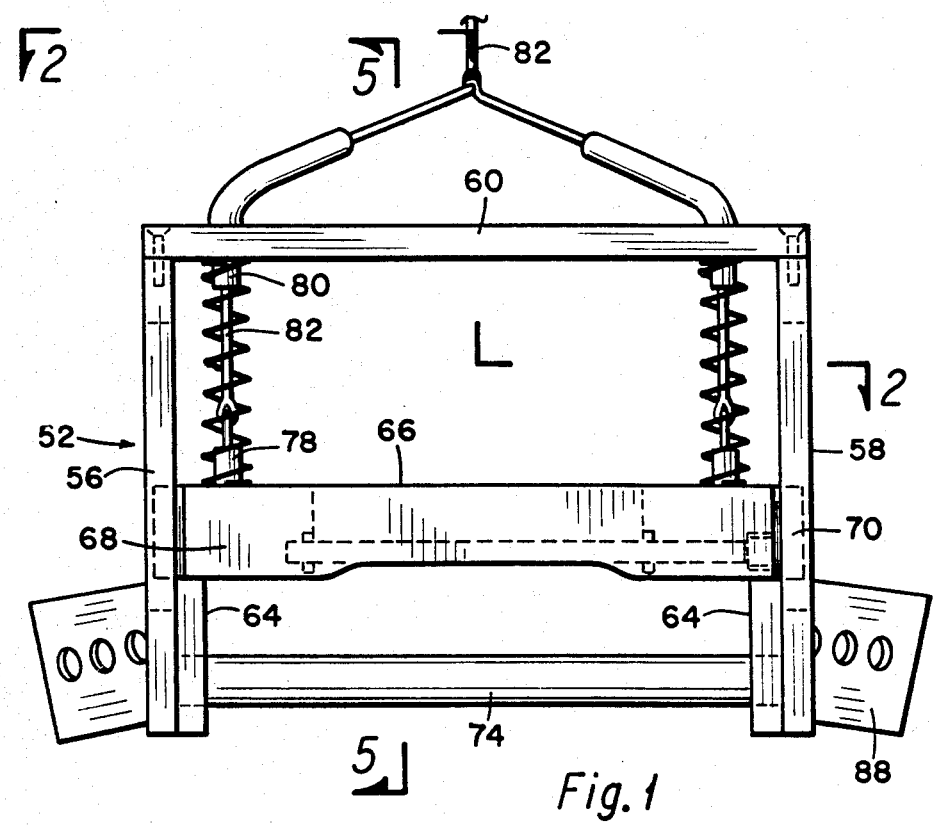

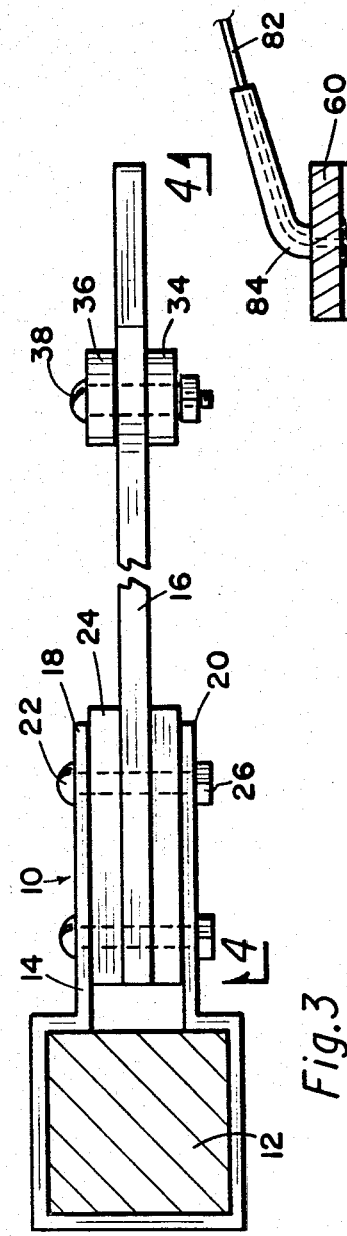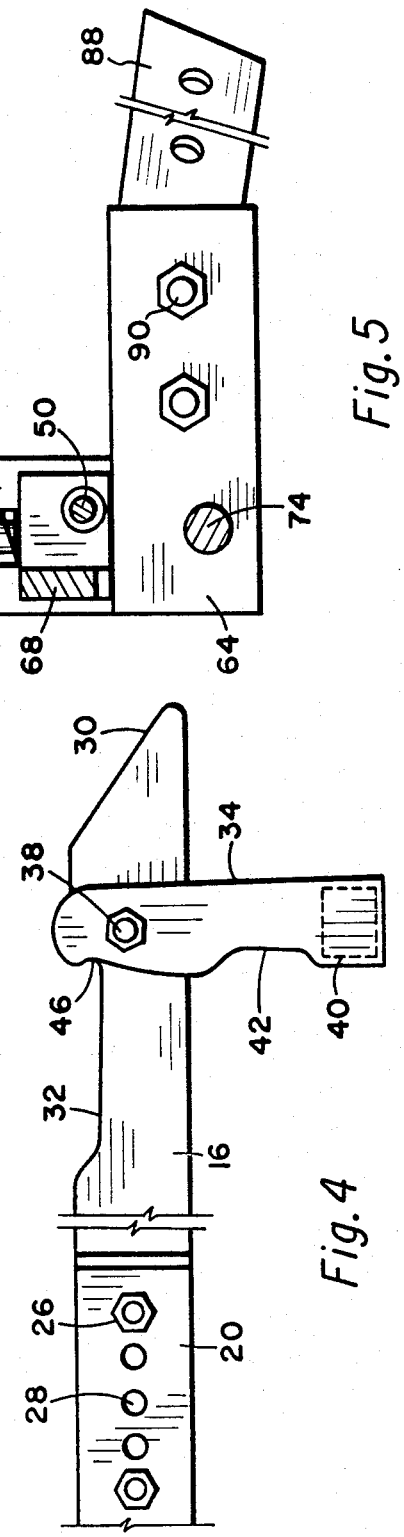

4,826,200

BOAT LOCKING DEVICE

DISCLOSURE STATEMENT

The following patents were submitted in a related application to show various automatic latching devices for boats;

U.S. Pat. No. 3,989,267
U.S. Pat. No. 3,989,266
U.S. Pat. No. 3,963,263
U.S. Pat. No. 3,938,829
U.S. Pat. No. 4,114,920
U.S. Pat. No. 4,463,965
U.S. Pat. No. 3,632,138

The following two patents were cited by the Examiner in a related application:

U.S. Pat. No. 4,463,965; Lawson
U.S. Pat. No. 2,491,373; Goff

BACKGROUND OF THE INVENTION

This invention relates to devices for latching a boat to a boat trailer.

It has been a long common practice to haul a boat from one body of water to another or to its storage by use of a trailer. When loading or unloading a boat from a trailer, the trailer is normally backed down an incline ramp leading to the water itself. The boat is secured in some manner to the trailer and when the ramp has reached the desired depth of the water, the securing means is released and the boat is permitted to float out into the water. When the boat is to be loaded back onto the trailer, the boatless trailer is then backed down the ramp and awaits the boat. The boat is then guided onto the trailer and secured to the trailer in some manner. Normally, it is common to align a boat with a boat trailer and then use the driving of the boat and the winch attached to the front of the boat to move the boat onto the trailer.

SUMMARY OF THE INVENTION

This is a latching mechanism for securing a boat to a staff or upstanding post on a trailer used for hauling a boat. The latching mechanism includes one part secured to the staff on the trailer and a second part secured to the bow of the boat. The part which is attached to the staff of the trailer includes a an elongated horizontal bar which is mounted substantially horizontal thereon. The end away from the staff is pointed and is in the direction of the rear of the boat. Near that pointed end is a notch on the upper side. A pair of swinging lock arms are pivotally attached to the horizontal bar near its pointed end so that the swinging arm will in a relaxed position be subsantially vertical. In this position the upper end of the swinging bar arm extends above the horizontal bar and the lower end extends substantially below it. The part of the swinging arm which extends below it is provided with a notch on the side which is closest to the staff.

The part which is attached to the bow of the boat and is used for receiving the horizontal bar and the swinging locking arms will now be briefly described. This includes a holding bar frame which has a top and two vertical sides so that the holding bar frame is substantially U-shaped with the lower end open. Across the lower end is a rounded holding bar. A stress bar is slidably mounted between the two vertical side members of the holding bar frame and is spring biased toward the rounded holding bar. The stress bar holds a rotatable or rolling bar which is substantially parallel to the rounded holding bar. Stop means on the side of the holding bar frame limits the downward movement of the rolling bar so that there is always a space between the rolling bar and the round holding bar so that the pointed nose of the horizontal bar on the staff can pass between these two round bars. As the horizontal bar passes through this space, the swinging lock arms are rotated up so that they can pass through this space too. However, once the swinging lock arms are through this space they will drop into a vertical position and cannot move back through this locking space until released.

Means are provided to release the swinging lock arms. This is accomplished by pulling on a cable which is attached down through the compression springs to the stop and release bar assembly. Pulling on this cable pulls the rolling bar up so that it is above the top of the swinging lock arms. Then, force on the lower end of the swinging lock arms will then rotate it to a horizontal position so that the horizontal bar can pass back through the locking space between the lower rounded holding bar and the movable rolling bar and the stop and release bar assembly. The boat is then effectively released from the trailer.

BRIEF DESCRIPTION OF THE DRAWINGS

FIG. 1 is a full face front view of the portion of the latching means which is attached to the bow of the boat.

FIG. 2 is a view taken along the line 2—2 of FIG. 1.

FIG. 3 is a top view of the portion of the latching means which is attached to the trailer.

FIG. 4 is a view taken along the line 4—4 of FIG. 3.

FIG. 5 is a view taken along the line 5—5 of FIG. 1.

FIG. 8 is the next sequence of FIG. 7 and shows the swinging lock arm dropping into a vertical position.

FIG. 9 is the next sequence from FIG. 8 and when the force on the boat pulling it toward the trailer is released, the swinging lock arm will take the position shown in FIG. 9 with the boat securely locked to the trailer.

DETAILED DESCRIPTION OF THE INVENTION

Figure 6:
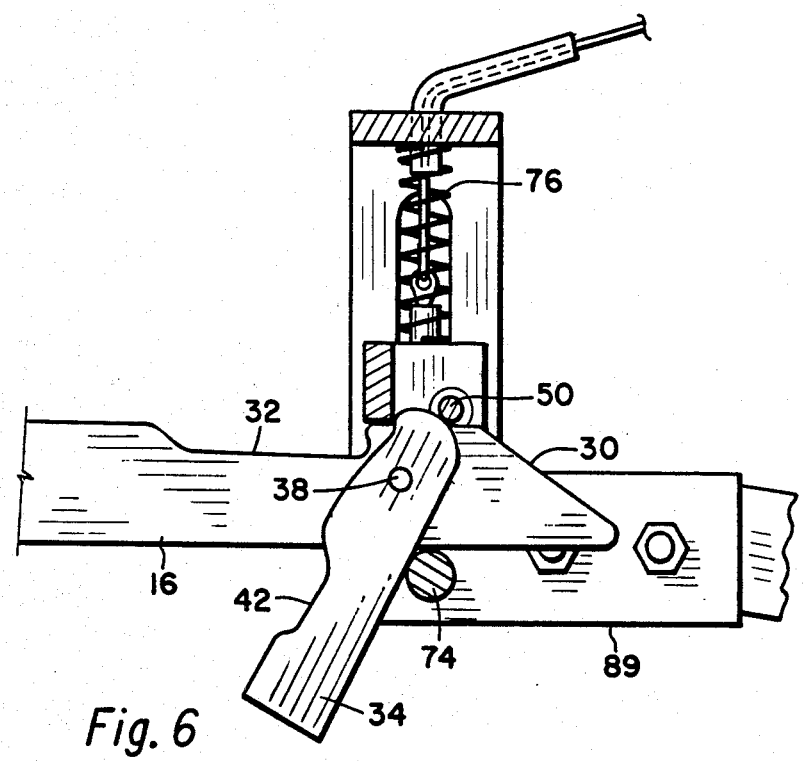
FIG. 6 shows the horizontal bar as it starts to pass between the lower rounded holding bar and an upper round stop and release rolling bar with the vertical swinging arm being moved out of its vertical position.
Figure 7:
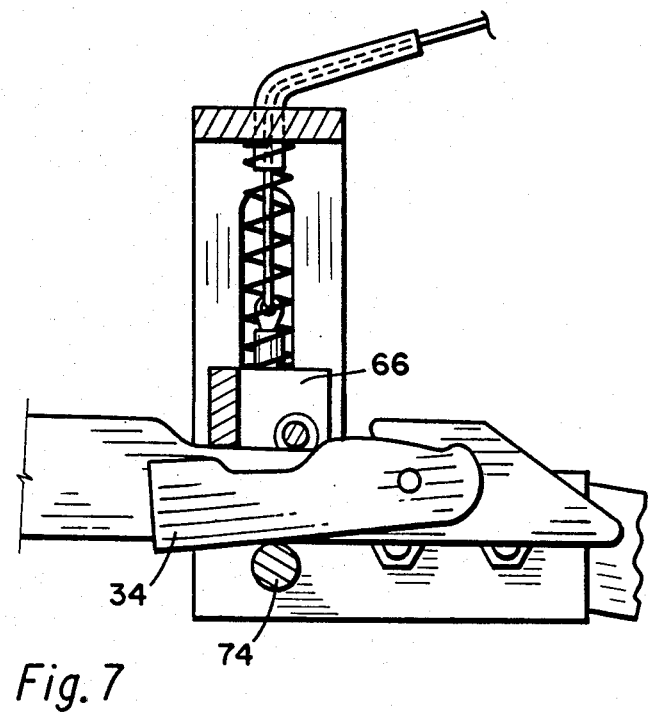
FIGS. 7, 8 and 9 are similar to FIG. 6 and show the next three sequences of the position of the swinging lock arms as the horizontal bar goes further through the space between the lower rounded holding bar and the upper stop rolling bar.
Figure 8:
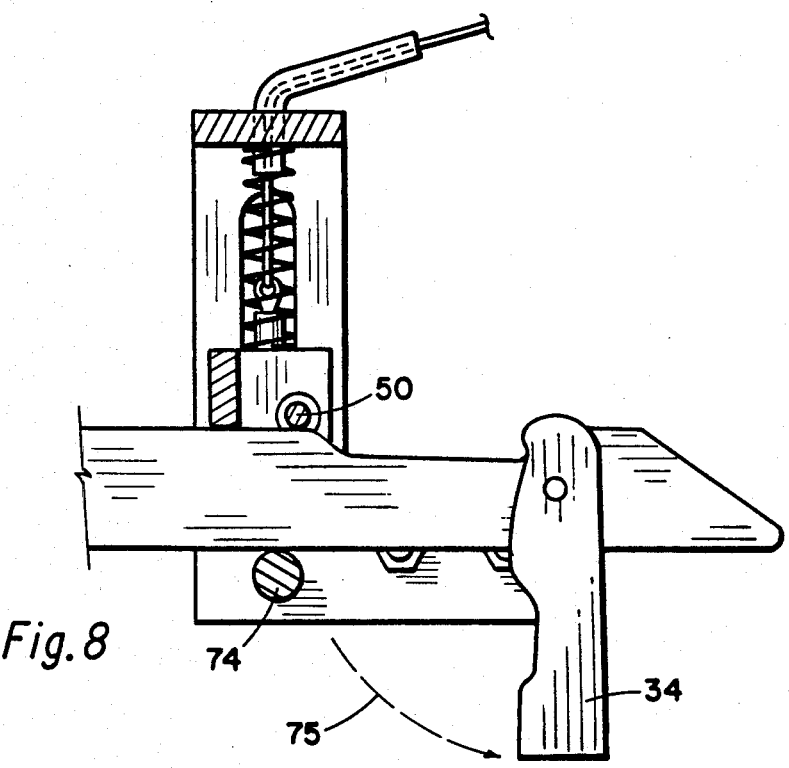

Attention is first directed to FIGS. 3 and 4 which shows that part of my locking mechanism which is attached to the trailer. As shown in FIG. 3 a horizontal bar 10 is clamped to staff 12 which is mounted on the trailer and is sometimes called an upright post. The horizontal bar 10 includes a clamp 14 which fits the round staff 12. A bar 16 is held in position between arms 18 and 20 of the clamp means 14 and is held in position by screws 22. Spacer members 24 may be inserted as necessary. The horizontal extension bar 16 may have a plurality of holes for adjusting the extension thereof.

The arm 20 is shown as having a plurality of holes 28 for adjusting the position of the horizontal arm. A nut 26 is applied to bolt 22.

As clearly shown in FIG. 4 the outer or rear end of horizontal extension bar 16 has a sloping face 30. The end of bar 16 might be more pointed and even be V-shaped even though the shape shown in FIG. 4 is the preferred shape. A notch 32 is provided in the upper edge of bar 16. As will be seen notch 32 is rounded on each end and is made to accommodate rolling bar 50 as is shown in FIG. 2 and will be discussed later. A first swinging arm 34 and a second swinging arm 36 is pivotally attached by bolt 38 to bar 16. As shown in FIG. 4 the swinging lock arm 34 preferably has a weight 40 at its lower end so that the locking arm will take the vertical position shown when there is no restraining force applied thereto. The pivot 38 is adjacent notch 32. When in the position shown in FIG. 4 the side of swinging lock arm 34 toward the staff 12 is provided with a notch 42 which has rounded ends. The upper end of swinging lock arm 34 is rounded as shown at 44 and is provided with a rounded indentation 46 for receiving rolling bar 50. The width of swinging locking arms 34, 36 is not over about the width of horizontal bar 16.

Attention is now directed especially to FIGS. 1, 2 and 5 which shows the portion of the locking mechanism which is attached to the bow of the boat (not shown). As shown in FIG. 1 there is a holding bar frame 52 which has a first vertical side 56, a second vertical side 58 and a top side 60. Each vertical side member 56 is provided with a guide slot or channel 62 as shown in FIG. 2. Stops 64 are provided at the lower end of vertical sides 56 and 58. A stop and release bar assembly 66 is slidably mounted between vertical side members 56 and 58 and can move between a lower position shown in FIG. 1 when it is against stops 64 and an upper position. The stop and release bar assembly 66 includes a stress bar 68. The ends of stress bar 68 are provided with guide ribs 70. Stress bar 68 is notched as shown to accommodate rolling bar 50. This rolling bar is preferably mounted by bearings in the end portions 72 of stress bar 68. A round holding bar 74 is mounted between stops 64 of side frames 56 and 58. It is preferably mounted in bearings so that it will rotate easily.

The stop and release bar assembly 66 is biased toward stops 64. This biasing means includes compression spring 76 which is held in position at the lower end by rod 78 which connects to the stress bar 68 and at the upper end by rod 80 which is connected to the top 60. A cable 82 connects rod 78 to release cable 82. There is a similar cable on each side of the stop and release bar assemblies as clearly shown in FIGS. 1 and 2. Release cable 82 passes through the bow of the boat. Release cable 82 may be passed through the bow of the boat using any means such as gasket in its housing so that water will not enter therethrough. The release cable can be fastened anywhwere desired inside the boat. Each cable 82 passes through the top 60 through grommet 84 or other friction reducing devices. Horizontal extensions 86 are connected to the side frames 58 and 56 and may be a part of stops 64. Each such horizontal extension 86 is provided with an outwardly flared perforated attaching band 88. This band 88 is held to extension 86 by bolts 90 or any other well known means. The flared ends are attached to the bow of the boat by extending bolts through the perforations through the holes in the bow of the boat. The inside of the boat is provided with stress plates (not shown) in order to spread the stress of the load outwardly from the hole so it will not tear a hole in the bow of the boat. In order to protect the boat there is also a bumper 94 as schematically indicated in FIG. 2. This, as will be seen, protects it from the damage of the point 30 of the bar 16.

Figure 9:
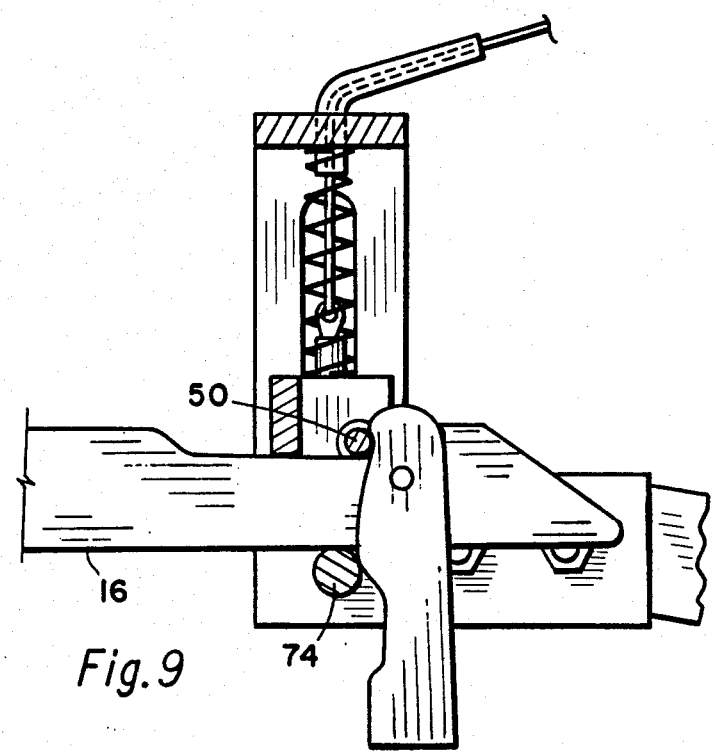

Attention is now directed to FIGS. 6, 7, 8 and 9 which shows the sequence of operations for locking the mechanism shown in FIGS. 1 and 2 which is attached to the bow of the boat to the mechanism shown in FIGS. 3 and 4 which is attached to the staff of the trailer. As the boat approaches the trailer in the water the device is in the position shown in FIG. 4. However, as soon as the bar 16 starts to pass between rounded holding bar 74 and stop and release rolling bar 50 the front surface of swinging lock arm 34 contacts the lower rounded holding bar 74 which causes the lock arm 34 to pivot about pivot 38 to the position shown in FIG. 6, for example. The front of bar 16 is sloping so that the face, when it contacts the stop and release rolling bar 50 forces it upwardly compressing the springs 76. As the boat comes further toward the trailer, the swinging lock arm 34 will take the position shown in FIG. 7. Further movement of the boat will let the swinging lock arm 34 clear the holding bar 74. As soon as it clears bar 74 there is nothing to hold the locking arm 34 in the horizontal position and it will swing down as indicated by arrow 75 in FIG. 3 to the vertical position. As mentioned earlier it is preferred to add extra weight to the lower end of swinging locking arm 34 so that it will readily assume the position shown in FIG. 8. When in this position the boat will then back off and as it does the swinging lock arm will assume its locked position as shown in FIG. 9. It is to be noted that there is a swinging lock arm on each side of the bar 16. When in the locked position of FIG. 9, the holding bar 74 prevents the swinging lock arm 34 from swinging one direction and the stop and release rolling bar 50 prevents it from rotating in the other direction. Thus, the boat is effectively locked to the trailer.

Figure 10:
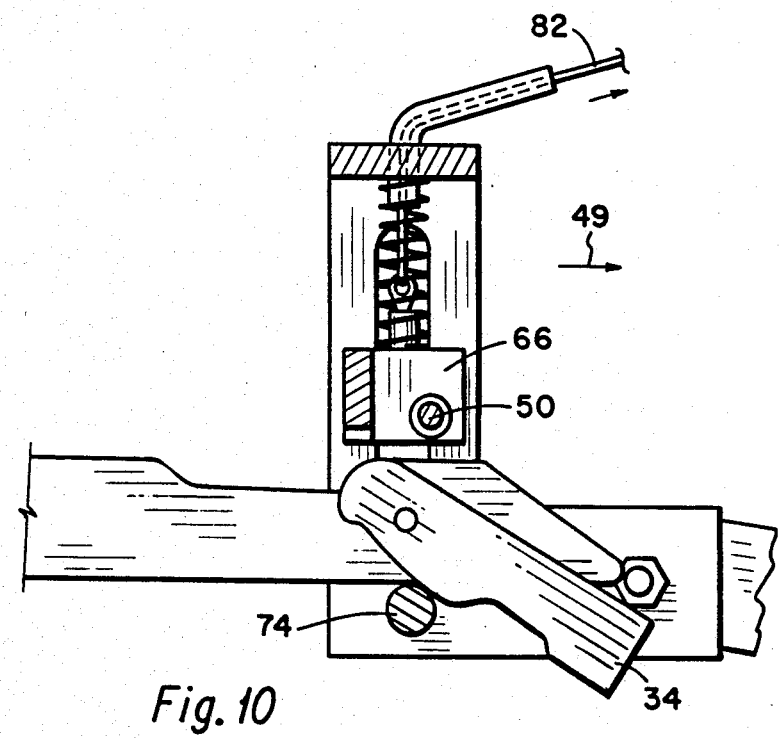
FIG. 10 is similar to FIG. 9 but shows the first step in the sequence of unlocking the boat from the trailer.
Figure 11:
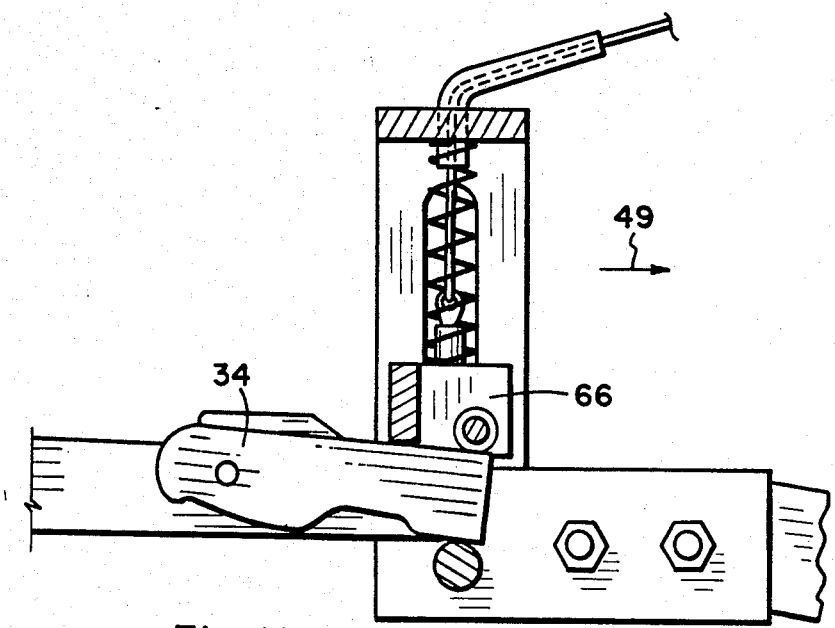
FIG. 11 is similar to FIG. 10 except that the swinging lock arms have been rotated to a horizontal position and are just clearing the rounded locking bars.

Attention is now directed to FIGS. 10 and 11 to show the sequence of events which occur when it is desired to release the boat from the trailer. The procedure is quite simple. One merely pulls on release cable 82 from anywhere in the boat. That pulls up on the stop and release bar assembly 66 which pulls rolling bar 50 up over the end of swinging lock arm 34. The rolling bar 50 is bearing mounted so that it will roll right over the end of the swinging lock arm 34. As the boat moves in the directions of the arrows 49 force from the holding bar 74 causes the swinging lock arm 34 to assume the position shown in FIG. 11. Continued movement of the boat in the direction of arrows 49 causes the latching assembly attached to the boat to separate from that part of the latching assembly attached to the staff on the trailer.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What I claim is:

1. A locking mechanism for connecting the bow of a boat to the staff of a trailer which comprises:

a horizontal bar connected at one end to said staff and the other end having a sloping end and a notch near said other end;

a swinging lock arm pivotally attached near one end to said horizontal bar adjacent the notch therein;

a bar holding frame having two sides and a top, each side having guide slots;

a first rounded bar supported between said side near the ends away from said top;

a stop and release bar assembly including
 (i) a stress bar means having guide ribs for following the guide tracks;
 (ii) a stop and release rolling bar supported by said stress bar parallel to said first rounded bar;
 (iii) biasing means urging said stress bar towards said first round bar;
 (iv) a release cable connected to said stress bar for moving said stress bar away from said first rounded bar.

2. The locking mechanism as defined in claim 1 in which weight has been added to one of said swinging lock arm.

3. A locking mechanism for connecting the bow of a boat to the staff of a trailer which comprises:
 a first part connectable to said staff which includes:
  a horizontal bar connectable to said staff, the end of said bar away from said staff having a sloping surface and a notch along the upper edge thereof;
  a swinging lock arm pivotally connected to said horizontal bar;
 the part connectable to said bow includes:
  a frame having two spaced apart sides;
  a holding bar connected between the ends of said two sides;
  a rolling bar supported by said frame; means to move said rolling bar between a first and second position between said side members;
  the distance between said holding bar and said rolling bar when the rolling bar is in its first position being less than the width of said swinging lock arm than when in the second position being greater; means to move said holding bar between said first and second positions.

4. A locking mechanism as defined in claim 3 in which said holding bar and said rolling bar are each bearing supported from said sides.

5. A locking mechanism as defined in claim 3 in which a weight has been added to one end of said swinging lock arm.

* * * * *